United States Patent
Hilbig et al.

(10) Patent No.: US 10,661,633 B2
(45) Date of Patent: May 26, 2020

(54) HEATING DEVICE

(71) Applicant: SIGNIFY HOLDING B.V., Eindhoven (NL)

(72) Inventors: Rainer Hilbig, Aachen (DE); Achim Gerhard Rolf Koerber, Eindhoven (NL); Paul Van Der Sluis, Eindhoven (NL); Mareike Klee, Straelen (DE); Wilhelmus Cornelis Keur, Weert (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 518 days.

(21) Appl. No.: 14/389,162

(22) PCT Filed: Mar. 20, 2013

(86) PCT No.: PCT/IB2013/052201
§ 371 (c)(1),
(2) Date: Sep. 29, 2014

(87) PCT Pub. No.: WO2013/144783
PCT Pub. Date: Oct. 3, 2013

(65) Prior Publication Data
US 2015/0041099 A1   Feb. 12, 2015

Related U.S. Application Data

(60) Provisional application No. 61/617,153, filed on Mar. 29, 2012.

(51) Int. Cl.
*B60H 1/22* (2006.01)
*F25B 17/08* (2006.01)
(Continued)

(52) U.S. Cl.
CPC ............ *B60H 1/22* (2013.01); *B60H 1/3201* (2013.01); *B60H 1/32014* (2019.05); *F25B 17/08* (2013.01); *F28D 20/021* (2013.01)

(58) Field of Classification Search
CPC ................................ B60H 1/22; B60H 1/3201
See application file for complete search history.

(56) References Cited

U.S. PATENT DOCUMENTS 4,030,896 A * 6/1977 Wimber ................ B01D 53/04
165/10
4,660,629 A   4/1987 Maier-Laxhuber et al.
(Continued)

FOREIGN PATENT DOCUMENTS

DE   19539103 A1   4/1997
EP    1162415 A1  12/2001
(Continued)

OTHER PUBLICATIONS

S.M. Aceves, "Analysis and Optimization of an Adsorption Air Conditioner for Electric Vehicle Applications", Lawrence Livermore National Laboratory, Livermore, CA, 94550, undated, pp. 1-26.
(Continued)

*Primary Examiner* — Avinash A Savani
*Assistant Examiner* — Deepak A Deean
(74) *Attorney, Agent, or Firm* — Akarsh P. Belagodu

(57) ABSTRACT

The present invention relates to a heating device. In order to allow heating essentially without any latency period and with low costs, the heating device comprises: at least one container (12) having an inlet opening (14) and an outlet opening (16) and comprising an adsorbent agent (18) being provided between said inlet opening (14) and outlet opening (16) and being capable of adsorbing an adsorbate thereby releasing adsorption energy; and a gas conveying device (21) for conveying an adsorbate comprising gas through the interior of the container (12); wherein a gas conduit (22) is provided being connected to the outlet opening (16) of the container (12) for guiding the gas heated by adsorption energy inside the container (12) to a location to be heated
(Continued)

with elevated temperature. The present invention further relates to a heating method.

8 Claims, 3 Drawing Sheets

(51) Int. Cl.
*B60H 1/32* (2006.01)
*F28D 20/02* (2006.01)

(56) References Cited

U.S. PATENT DOCUMENTS

| | | | | |
|---|---|---|---|---|
| 5,240,475 | A * | 8/1993 | Andersson | B01D 53/04 95/107 |
| 5,388,423 | A * | 2/1995 | Khelifa | B60H 1/00007 237/12.3 A |
| 5,435,150 | A * | 7/1995 | Khelifa | B60H 1/00007 165/42 |
| 5,482,538 | A * | 1/1996 | Becker | B01D 53/0454 95/12 |
| 5,566,880 | A * | 10/1996 | Khelifa | B60H 1/00392 237/12.3 A |
| 6,619,071 | B2 * | 9/2003 | Sato | B60H 1/3201 62/112 |
| 7,066,986 | B2 * | 6/2006 | Haben | B01D 53/0423 95/106 |
| 7,266,967 | B2 * | 9/2007 | Inoue | B60H 1/3201 62/101 |
| 7,360,375 | B2 * | 4/2008 | Mola | B60H 1/3201 62/271 |
| 8,966,914 | B2 * | 3/2015 | Stannard | B60H 1/3201 62/238.3 |
| 2004/0112211 | A1 * | 6/2004 | Meirav | B01D 53/047 95/8 |
| 2004/0118278 | A1 * | 6/2004 | Kawai | B01D 53/047 95/96 |
| 2008/0229766 | A1 * | 9/2008 | Sharma | F24F 5/0014 62/101 |
| 2010/0101271 | A1 * | 4/2010 | Pogadaev | B60H 1/3201 62/477 |
| 2010/0293966 | A1 * | 11/2010 | Yokomachi | B60H 1/00478 62/3.2 |
| 2011/0277490 | A1 * | 11/2011 | Meirav | B01D 53/60 62/89 |
| 2012/0324931 | A1 * | 12/2012 | Alden | F25B 27/00 62/157 |
| 2013/0152787 | A1 * | 6/2013 | Boulet | B01D 53/0462 95/91 |
| 2013/0183894 | A1 * | 7/2013 | Watanabe | B01D 53/261 454/127 |

FOREIGN PATENT DOCUMENTS

| | | |
|---|---|---|
| EP | 1391238 A2 | 2/2004 |
| JP | H05196318 A | 8/1993 |
| JP | H071944 A | 1/1995 |
| JP | H09136532 A | 5/1997 |
| JP | H1119448 A | 1/1999 |
| JP | 2001526110 A | 9/2007 |

OTHER PUBLICATIONS

T.J. Hendricks, et al., "Heat-Generated Cooling Opportunities", Center for Trans. Tech. and systems, National Renewable Energy Laboratory, Golden, CO, undated, pp. 1-15.

D. Magnetto, et al., "A Metal Hydride Mobile Air Conditioning System", SAE Internationals, 2006, pp. 1-10.

* cited by examiner

HEATING DEVICE

CROSS-REFERENCE TO PRIOR APPLICATIONS

This application is the U.S. National Phase application under 35 U.S.C. § 371 of International Application No. PCT/IB2013/052201, filed on Mar. 20, 2013, which claims the benefit of U.S. Provisional Patent Application No. 61/617,153, filed on Mar. 29, 2012. These applications are hereby incorporated by reference herein.

FIELD OF THE INVENTION

The invention relates to the field of heating devices. More particularly, the invention relates to heating devices having an improved heating behavior and particularly being used in vehicles such as motor vehicles.

BACKGROUND OF THE INVENTION

Heating of the interior of motor vehicles, for example, is known to be performed with the help of waste heat of a motor. For novel cars, however, as well as for ambient temperatures lying far below room temperature, it takes a rather long time after starting the motor in order to generate sufficient waste heat in order to heat the interior of the vehicle. Especially in case no additional heating sources are used, the time until the interior is sufficiently heated may be long and may thus have a negative influence with respect to comfort of the passengers.

In order to reduce the time required for heating the interior of a vehicle, additional heating sources are known for heating the interior of a vehicle during the warming-up phase.

A first class of heating devices requires an additional power source. For example, a heater driven by electrical energy such as from a battery or a generator or by using fuel as energy source may be provided. It may directly interact with the standard air conditioning system in use. Due to the big volume inside a vehicle, such as typically more than 3 $m^3$, however, much energy is required to heat up the air inside the vehicle. As an exemplary value only, energy of approximately 78 kJ is required for increasing the temperature of 3 $m^3$ of air by 20° C. The energy consumption is even more significantly raised by heat losses caused by heat transfer to a car body, for example in case energy is provided on a longer time scale (for example >>1 s).

As to a second class, latent-heat storage systems are known which are heated up during normal car operation such as by waste heat of the motor. They are designed to perform a solid-liquid phase transition and to release this energy during car warming-up phase at low ambient temperatures. These heat accumulators may particularly be used in case this energy storage system is stored at temperatures above the phase transition temperature and ambient temperatures below. These heat storage systems furthermore are mostly over-dimensioned in order to hold a sufficient heating capacity during off times.

Known from U.S. Pat. No. 4,660,629 is furthermore a continuously acting adsorption device and a process for its operation. Such an adsorption device may be used for heating the interior of a motor vehicle. It comprises a plurality of adsorption containers which are separated into heater adsorber zones and condenser evaporator zones. The zones are successively rotated through flow segments which form a passageway for heat carrier flows. The heater adsorption zones contain an adsorption substance from which an operating substance is extracted by adsorbing heat from a heat carrier flow and is again adsorbed by emitting heat to a further heat carrier flow in a closed system. The operating substance condenses and evaporates by means of a heat exchange with heat exchangers.

There is, however, still the need for heating devices which may decrease the time required for heating up the interior of a vehicle during warming-up phase and/or which may be easy and cost-saving to build and/or to operate.

SUMMARY OF THE INVENTION

It is an object of the invention to provide a heating device which overcomes at least one of the deficiencies as set forth above. It is a particular object of the invention to provide a heating device which may decrease the time required for heating up the interior of a vehicle during warming-up phase and/or which is easy and cost-saving to build and/or to operate.

This object is achieved by a heating device according to claim 1. This object is furthermore achieved by a heating method according to claim 7. Preferred embodiments of the present invention are defined in the dependent claims.

The invention relates to a heating device, comprising: at least one container having an inlet opening and an outlet opening and comprising an adsorbent agent being provided between said inlet opening and outlet opening and being capable of adsorbing an adsorbate thereby releasing adsorption energy; and a gas conveying device for conveying an adsorbate comprising gas through the interior of the container; wherein a gas conduit is provided being connected to the outlet opening of the container for guiding the gas heated by adsorption energy inside the container to a location to be heated with elevated temperature.

The present invention provides a heating device which is capable of heating a location such as a volume, for example the interior of a vehicle, very efficiently and essentially without any latency period.

In detail, the heating device according to the invention comprises a container which is filled with an adsorbent agent. The adsorbent agent may preferably be a porous solid adsorbent agent. Particularly, a sieve bed is provided. The adsorbent agent is furthermore capable of adsorbing an adsorbate, thereby releasing adsorption energy. This may be realized, for example, by regenerating the adsorbent agent by removing potentially adsorbed substances at least partly and thus by providing an at least partly unloaded adsorbent agent, or by at least partly providing it with a regenerating adsorbate. The regenerating adsorbate may in turn be replaced by a further adsorbate having a higher adsorption energy compared to the regenerating adsorbate. Alternatively, the at least partly unloaded adsorbent agent may adsorb the adsorbate. This leads to adsorption energy to be generated.

In order to generate adsorption energy, an adsorbate comprising gas is conveyed through the interior of the container thereby coming in direct contact to and interacting with the adsorbent agent. The heating device therefore comprises a gas conveying device for conveying a gas comprising said adsorbate through the interior of the container. The container therefore comprises an inlet opening and an outlet opening through which the adsorbate comprising gas may be guided in order to flow through the interior of the container and thus the adsorbent agent. The adsorbent agent is thereby provided between the inlet opening and the outlet opening which means that a gas flow entering the container through the inlet opening and leaving the container through the outlet opening flows through and/or interacts with the adsorbent agent. It is preferred that the container, or at least a flowing path for the adsorbate comprising gas, is completely filled with said adsorbing agent, or sieve bed, respectively. Additionally, the respective openings may be provided with a kind of filter or disc comprising gas passages letting the gas pass but ensuring that the adsorbent agent is hold inside the interior of the container. The openings of the filter, or of the gas passages respectively, may be adapted to the minimum size of the particularly solid adsorbent agent particles and may be in the exemplary dimensions of ≥50 μm to ≤100 μm.

In order to use the released adsorption energy for heating purposes, the gas stream heated by adsorption energy may in turn be conveyed to the location to be heated with elevated temperatures. Therefore, a gas conduit is provided being connected to the outlet opening of the container for guiding the gas flow heated by adsorption energy inside the container to a location to be heated with elevated temperature. The gas stream is thus directly guided from the container to the location to be heated particularly without the provision of heat exchangers on that flowing path. Consequently, no desired means for removing energy, or heat, respectively may be provided at the container and/or on the flow path from the container to the location to be heated. In contrast thereto, the volume is heated by that gas stream which is used for guiding the adsorbate to the adsorbent agent and which in turn is heated by adsorption energy.

A heating device according to the present invention has thus the advantage that a heating process may be performed especially effective. In detail, due to the fact that the heat is directly transferred from the adsorbent agent to the gas stream which in turn is conveyed to the location such as a volume to be heated and the heating device is thus an open system with respect to the adsorbent agent and the location to be heated, no heat losses due to energy transfers such as through heat exchangers occur. Apart from that, due to the fact that the gas stream used for heating the location may directly flow through the pores of the adsorbent agent, a very effective heat exchange may be provided from the adsorbent agent to the gas stream wherein the porosity may be adjusted to provide good gas flowing properties. Additionally, due to the fact that the gas stream mostly flows through the bulk of the adsorbent agent, only little energy is lost through heat transfer to walls etc. As a result, essentially the whole heat being generated may be used for heating purposes.

Apart from that, further components such as heat exchangers or additional electrical heating devices as well as complex heat insulation systems are not required. Therefore, the heating device according to the invention does not or not essentially require additional electrical energy allowing operating it with very low costs. Furthermore, the heating device according to the invention is especially easy and cost saving to build and does not require complex and cost-intense arrangements and components or set-ups, respectively.

Furthermore, the heating step may be performed very fast and essentially without any latency period due to the fact that the adsorbent agent heats up instantaneously by released adsorption energy solely and directly by bringing in contact the latter with the adsorbate. Consequently, immediately after starting the heating device according to the invention, the conveyed gas stream is heated and may be used for heating purposes.

Additionally, the heating capacity of the heating device according to the invention may be varied and tailored to the desired application. In detail, the heating capacity is essentially dependent from the adsorption energy of the adsorbate and furthermore of the amount of adsorbent agent to be provided inside the container. Consequently, by adapting the type of adsorbent agent and/or the adsorbate and/or by adapting the amount of adsorbent agent being provided in the container and/or by adapting the regeneration method, the heating capacity may easily be tailored to the desired application.

Apart from that, the heating device according to the invention may be used independently from ambient temperatures. In detail, independent from the ambient temperature, a temperature increase may be realized due to adsorption energy. Furthermore, especially at low ambient temperatures, when the heating device may be especially useful, the temperature increase may be extended due to the fact that the adsorption capacity is higher at lower temperatures. Consequently, the temperature raise obtained is larger at low ambient temperatures and thus when it is particularly needed.

With respect to security matters a further advantage is provided. In detail, due to the fact that the heat generated is limited and well defined, no emergency shutoff has to be provided because an overheating is securely prevented or is essentially impossible, respectively.

The heating device according to the invention thus allows to significantly shortening the time being required for heating a location without dissipating lots of additional energy and thus without increasing the load of the electric circuitry during the warming-up phase and furthermore with a simple construction leading to reduced production costs.

According to an embodiment the heating device is part of a heating system of a motor vehicle. For example, the heating device is stationary installed in the vehicle. Especially with respect to a motor vehicle, the heating device according to the invention is particularly advantageous. In detail, motor vehicles generally heat their interior with waste heat from the motor. This, however, is not or not in a sufficient amount possible during the warming-up phase of the motor. This effect, however, leads to comfort losses for passengers especially at low ambient temperatures. Consequently, motor vehicles often use complex and energy consuming additional heating devices. By using a heating device according to the invention, however, no energy consuming heating devices are required. Contrary thereto, the interior of the vehicle may be heated with easy and cost-saving measures, thereby significantly reducing the heating time with respect to normal motor vehicles as well as with respect to additional electrical heaters. This is the fact due to the instantaneous heating procedure according to the invention in contrast to heating systems using heat exchangers which requires some starting time. Additionally, due to the lack of electrical heaters, energy may be saved. In case the vehicle may be heated by means of waste heat and thus after the warming-up phase of the motor, the adsorbent agent may be regenerated in order to restore the full heating capacity for a following heating cycle. Consequently, the adsorbent agent may be regenerated in case no heating effect is required and when energy for regenerating the adsorbent agent is well available.

Furthermore, especially during the warming-up phase of a motor vehicle when heating the interior of the latter, further electrical consumers such as window defrosters, seat heating and so on are often in use. As a result, a high electrical power input and thus large power consumption, such as in the range of 1 kW or even more is required. Consequently, by using the heating device according to an embodiment of the invention which has significantly reduced energy consumption, the requirements with respect to a generator or a battery respectively and furthermore with respect to electrical leads may be decreased. Consequently, the vehicle equipment may be much cheaper. No special requirements for introducing the heating device into a motor vehicle, for example, are necessary.

The present invention is furthermore well applicable for motor vehicles being fully or partly electrically driven. Especially with respect to these vehicles, no or only reduced waste heat of the motor is generated making a heating device being independent from waste heat especially interesting. Furthermore, the heating device may be regenerated at the same time the batteries are loaded leading to a very comfortable usage of the heating device.

According to a further embodiment the adsorbent agent comprises a zeolite or consists of a zeolite. A zeolite, or a zeolite material, respectively, is a component which has a large adsorption capacity for a plurality of adsorbates and may thus suitably be used for generating heat in a heating device according to the invention. Furthermore, a zeolite may adsorb an adsorbate and may be regenerated in a nearly unlimited number making it especially applicable over a long time of usage. Apart from that, zeolites generally are stable against decomposition even at ambient atmosphere making them easy to use, especially long-time stable and further cost-saving to operate with. Additionally, zeolites have advantages with respect to safety reasons. In detail, these kind of adsorbent agents are non toxic and thus not hazardous for human beings or the environment. Furthermore no danger will appear in case a vehicle provided with a heating device according to the invention may be damaged (for example by an accident). Additionally, by using a zeolite as adsorbent agent, the gas stream generated in the container is completely or at least essentially free of water or humidity, respectively due to the fact that zeolites are well adsorbent agents for water. This leads to the advantage that especially when applied in a motor vehicle, no water will condense at the windows in a cold condition of the car providing further advantages with respect to comfort as well as security.

According to a further embodiment, the interior of the container is sealable in an airtight manner against the outer atmosphere. This feature allows for long off-times of the heating device without any loss of the heating capacity, or without any negative influence of the heating behavior, respectively. In detail, in case the adsorbent agent is closed, or sealed, respectively, airtight against the outer atmosphere, no components will either desorb from or adsorb to the adsorbent agent. Consequently, in case the heating device is positioned in a motor vehicle and the adsorbent agent is regenerated during usage of the car, for example, a downtime of the vehicle, for example overnight or over a weekend or even longer, does not influence the heating capacity. In extreme cases, due to the fact that the regeneration adsorbate as such may be adsorbed to the adsorbent agent for a nearly unlimited time scale, the heating device may store its heating capacity over a whole winter in case gas exchange is sufficiently prevented and the gas stream which is used for heating purposes bridges the container filled with adsorbent agent. Consequently, in case the motor vehicle is used again after a downtime, the heating device may start instantaneously to work. The same holds, however, for every application of the heating device with respect to even long downtimes of the latter. This measure is especially easy and cost-saving, especially thinking about the fact that these heating devices do not have to be designed largely overdimensioned if they should come up with sufficient heating power even after off-times of the heating device, or a car, respectively. A sealing, however, is easy and cost-saving to implement into the heating device according to the invention. For example, the container may be closed in an airtight manner by use of airtight valves, for example upstream the inlet opening and downstream the outlet opening. An airtight manner shall thereby mean that no or essentially no gas exchange is allowed during off-times and at least at ambient pressure outside the container.

According to a further embodiment a heater, a vacuum pump and/or a gas source is provided for regenerating the adsorbent agent. The aforementioned devices are very easy and effective measures in order to regenerate the adsorbent agent in a short time scale. The regeneration device used may thereby be dependent from the application desired. In detail, in case a heat source is provided in vicinity to the container, or the adsorbent agent, respectively, the latter may easily and cost-effective be regenerated by heat. For example, the waste heat of the motor of a motor vehicle may be used for regenerating the adsorbent agent by providing a heat exchanger being thermally coupled to the adsorbent agent as well as to the motor or a heated part of the latter. This is especially advantageous due to the fact that in case no waste heat of the motor is present, the heating device shall heat the interior of the vehicle. If however waste heat of the motor may be obtained, the heating device according to the invention does not have to heat anymore and may thus be regenerated. In case a vacuum pump is provided, for example, the adsorbent agent may release all or essentially all compounds adsorbed so that the heating capacity is especially high. A gas source, for example, is especially easy to provide and has only limited requirements with respect to long off times of the heating device, such as a potentially air tightness of the container comprising the adsorbent agent. The gas to be used as regeneration adsorbate shall particularly comprise an adsorption energy being smaller than the adsorption energy of the adsorbate being used for generating heat. For example, oxygen or noble gases, such as helium, may be used as regeneration adsorbate in case nitrogen, for example, is used as adsorbate. Furthermore, a combination of different regeneration devices may be provided. For example, a gas source comprising a regeneration adsorbent may be used together with heat and/or with vacuum or vacuum may be used together with heat, for example. The gases used may particularly have a suitable purity, such as preferably ≥85%.

According to a further embodiment the heating device is a portable device. In detail, the heating device is especially well suited for being designed as a portable device. Due to the fact that the heat is generated solely by adsorption and/or desorption processes respectively, no further components such as heat exchangers, electrical heating devices and so on are required for heating purposes. Consequently, the heating device according to the invention may be built in very compact dimensions. Additionally, the energy consumption is very low and may essentially be provided solely for the gas conveying device, such as a fan. Therefore, no or only few heavy and space consuming batteries or generators, respectively, are required which is particularly advantageous for portable devices. The heating device according to this embodiment may thus be formed in an exemplary manner as heating device for locally heating a vehicle, for example used for defrosting windows, for heating the windscreen, or for heating a kind of comfort zone around the driver only. The energy required may in this case lie in an exemplary range of <20 kJ for a temperature increase of 20° C. with a volume to be heated of <0.5 m$^3$.

With respect to further advantages and technical features of the heating device according to the invention it is referred to the further remarks with respect to the method according to the invention, to the figures as well as to the description of the figures.

The present invention further relates to a heating method, said method comprising the steps of: providing at least one container having an inlet opening and an outlet opening and comprising an adsorbent agent being provided between said inlet opening and outlet opening and being capable of adsorbing an adsorbate thereby releasing adsorption energy; conveying an adsorbate comprising gas through the interior of the adsorbent agent comprising container, wherein the adsorbate is adsorbed by the adsorbent agent, thereby heating the gas being guided through the interior of the container by adsorption energy; and guiding the heated gas to a location to be heated.

A heating method according to the present invention is especially applicable to a heating device according to the invention. The heating method provides thus the advantage that a heating process may be performed especially effective. In detail, due to the fact that the heat is directly transferred from the adsorbent agent to a gas stream which in turn is conveyed to the location to be heated, no heat losses due to energy transfers such as through heat exchangers occur. Consequently, essentially the whole heat being generated may be used for heating the location. In other words, the adsorption energy released by adsorption processes is directly used for heating a location without further essential energy converting steps.

Apart from that, further components such as heat exchangers or additional electrical heating devices are not required for generating heat. Therefore, the heating method according to the invention does not require additional electrical energy allowing a process with very low costs. The heating method according to the invention is thus especially easy and cost saving to perform and does further not require complex and cost-intense arrangements and components or set-ups, respectively.

Furthermore, the heating step as such may be performed very fast and essentially without any latency period due to the fact that the adsorbent agent heats up instantaneously by released adsorption energy solely and directly by bringing in contact the latter with the adsorbate comprising gas stream. Consequently, immediately after beginning with the heating method according to the invention, the conveyed gas stream is heated by direct contact with the adsorbent agent and may be used for heating the location to be heated.

Additionally, the heating capacity of the heating device performing a heating method according to the invention may be varied and tailored to the desired application. In detail, the heating capacity is essentially dependent from the adsorption energy of the adsorbate and furthermore of the amount of adsorbent agent to be provided inside the container. Consequently, by adapting the adsorbent agent and/or the adsorbate and/or by adapting the amount of adsorbent agent being provided in the container and/or by adapting the regeneration step, the heating capacity may easily be tailored to the desired application.

The heating method according to the invention thus allows to significantly shortening the time being required for heating a location without dissipating additional energy and thus with reduced operating costs and furthermore with a simple construction leading to reduced production costs.

According to an embodiment, nitrogen is used as adsorbate. This embodiment provides the advantage that the adsorbent agent may be brought in contact with a nitrogen comprising gas, such as air, in order to adsorb the adsorbate and in order to generate heat. Consequently, either small, exchangeable gas cylinders may be used or, in case ambient air is used as nitrogen comprising gas, no adsorbate has to be stored at all leading to less costs by operating the heating method and furthermore to an especially compact design possible. Apart from that, by conveying nitrogen, or air, respectively, through the container comprising the adsorbate, the gas may without any problem be guided to the location to be heated even if the location, or volume, respectively is essentially closed to the outside, such as the interior of a vehicle. This however does not negatively influence the passengers travelling inside the vehicle and does further not lead to a security problem. A nitrogen comprising gas shall thereby particularly mean a gas which consists of nitrogen or which at least partly comprises nitrogen.

According to a further embodiment, an oxygen comprising gas is used for regenerating the adsorbent agent. Oxygen may well be provided, for example, by using a pressurized oxygen container or by using an oxygen concentrator in order to generate oxygen on demand. This may thus be an especially cost-saving embodiment in order to generate heat. Apart from that, oxygen has an adsorption energy being suitably smaller compared to nitrogen, especially when thinking about using a zeolite material as adsorbent agent. Consequently, by exchanging oxygen against nitrogen when operating the heating device, much heat may be generated leading to an especially effective heating process. Furthermore, especially by using nitrogen as adsorbate and particularly by guiding air through the container comprising the adsorbent agent, oxygen is desorbed from the adsorbent agent when generating heat leading to oxygen enriched air flowing to the location to be heated such as into the interior of a vehicle, which is very well applicable to passengers. An oxygen comprising gas particularly shall mean a gas which consists of oxygen or which at least partly comprises oxygen. Preferred are oxygen concentrations are lying in a range of $\geq 85$ vol.-% in order to achieve a suitable loading behavior with respect to oxygen, or an exchange of the adsorbate, respectively.

According to a further embodiment, heat and/or vacuum is used for regenerating the adsorbent agent. In detail, in case a heat source is provided in vicinity to the container, or the adsorbent agent, respectively, the latter may easily and cost-effective be regenerated by heat. For example, the waste heat of the motor of a motor vehicle may be used for regenerating the adsorbent agent. This is especially advantageous due to the fact that in case no waste heat of the motor is present, the heating device shall heat the interior of the vehicle. If however waste heat of the motor may be obtained, the heating device according to the invention does not have to heat anymore and may thus be regenerated. In case a vacuum pump is provided, for example, the adsorbent agent may release all or essentially all compounds adsorbed so that the heating capacity is especially high. The use of heat and/or vacuum however may well be used together with the usage of a regeneration adsorbate such as a gas.

With respect to further advantages and technical features of the method according to the invention it is referred to the remarks with respect to the heating device according to the invention, to the figures as well as to the description of the figures.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1A:
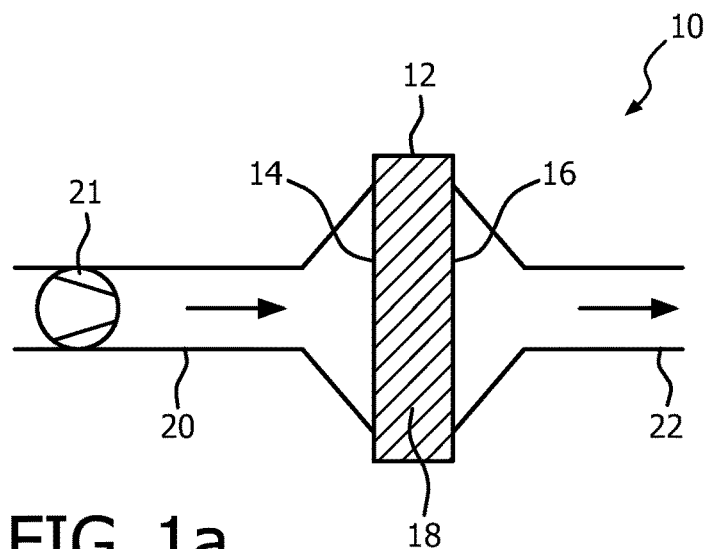
FIG. 1a shows an embodiment of a heating device according to the invention in a fully regenerated mode.

In FIG. 1, a heating device 10 according to the invention is schematically shown. Such a heating device 10 may exemplarily be used in motor vehicles and may be permanently installed in the vehicle. Alternatively, the heating device 10 may be designed as a portable device for usage in vehicles or other heating applications.

The heating device 10 comprises at least one container 12, such as a cartridge, having a first opening or inlet opening 14 and a second opening or outlet opening 16. The inlet opening 14 as well as the outlet opening 16 may be designed and adapted to the present application as long a gas flow may enter the container 12 through the inlet opening 14 and leave the container 12 through the outlet opening 16, for example. The inlet opening 14 as well as the outlet opening 16 may preferably be designed as a perforated plate, for example.

The container 12 further comprises, or is filled with, an adsorbent agent 18 capable of adsorbing an adsorbate thereby releasing adsorption energy. The adsorbent agent 18 may for example be a sieve bed completely filling the interior of the container 12. The adsorbent agent 18 may preferably be a zeolite material, such as a LiLSX-faujasite. The maximum of the stored energy using a Li-sieve at 1 bar may be in an exemplary range of approximately 30 kJ/kg. In order to heat the entire car, for example, approximately 3 kg of zeolite are needed with respect to a heating device being permanently fixed to the vehicle, and furthermore 0.5 kg for portable devices may be sufficient.

Furthermore, the interior of the container 12 and thus the provided adsorbent agent 18 may be sealed in an airtight manner against the outer atmosphere. The adsorbent agent 18 is used as a kind of energy storage media that is capable of converting adsorption energy into heat directly when starting the heating device 10. Adsorption energy may be restored again during regeneration, for example at car operation after warming-up phase of said vehicle.

Furthermore, a gas conveying device 21, which may be a fan, a pump, or the like for conveying an adsorbate comprising gas through the interior of the container 12, is provided. The adsorbate may preferably comprise nitrogen, and may be present in a nitrogen comprising gas such as air. This results in a preferred example of the present invention, which may be an air driven zeolite system particularly using zeolites as known from oxygen concentrators, for example. In this embodiment, energy to quickly heat air is generated by feeding the container 12, such as the zeolite cylinder, particularly being free of any adsorbate or for example being oxygen loaded, particularly with air of the air conditioning, for example. Energy is released by replacement of oxygen by the nitrogen in an air feed due to the fact that nitrogen comprises much higher adsorption energy. This comes up with a temperature increase of the passing gas stream; for the given example, this increase is directly correlated to the difference of the adsorption energies of nitrogen and oxygen at the zeolite. Using lithium exchanged faujasite material, for example, more than 20° C. air temperature increase is feasible, wherein the amount of energy stored by 100% exchange of oxygen by nitrogen with a zeolite adsorbent agent is approximately 30 kJ/kg. However, the energy storage capacity is proportional to the amount of used adsorbent agent 18.

Generally, for generating heat, the adsorbent agent 18 has thus to be regenerated and thus at least partly unloaded or at least partly loaded with an adsorbate having and adsorption energy $e_1$ with respect to the adsorbent agent 18. In order to generate heat, adsorption energy, which may directly be used for heating purposes may be released by bringing in contact the adsorbent agent 18 with an adsorbate having an adsorption energy $e_2$, wherein the adsorption energy $e_2$ is higher with respect to the adsorption energy $e_1$. This is shown in the following figures.

Figure 1B:
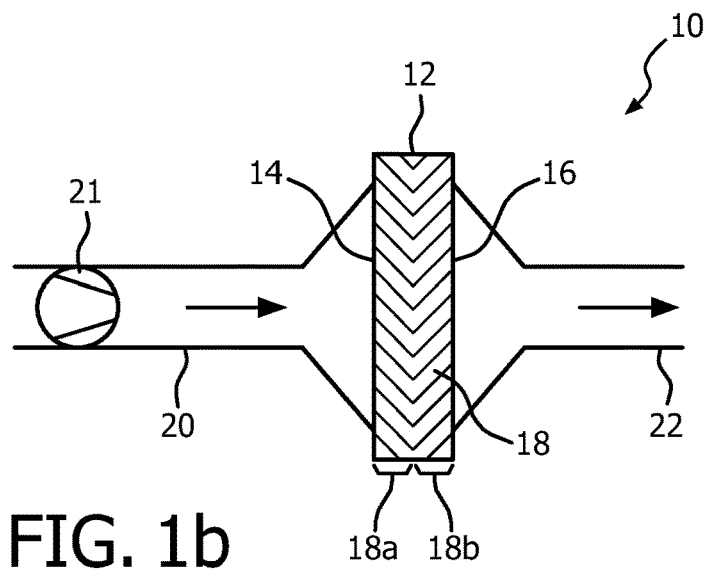
FIG. 1b shows the embodiment of FIG. 1a in a partly loaded mode.
Figure 1C:
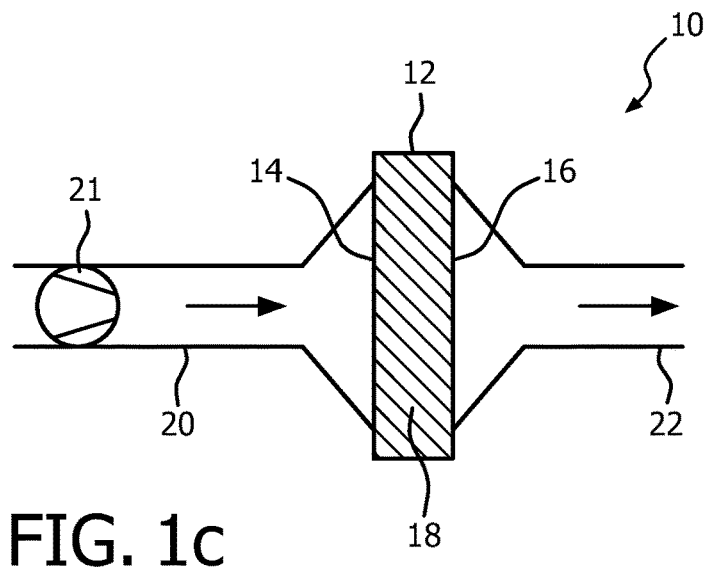
FIG. 1c shows the embodiment of FIG. 1a in a fully loaded mode.

Whereas FIG. 1a shows a heating device 10 comprising an adsorbent agent 18 being fully regenerated and thus capable of generating heat, FIGS. 1b and 1c respectively show a heating process performed with the heating device 10 according to the invention and thus an adsorbent agent 18 being partly or fully loaded with an adsorbate for generating heat, such as nitrogen.

According to FIG. 1b, an adsorbate comprising gas, such as air in the case nitrogen is used as adsorbate, is conveyed to the container 12 through an inlet conduit 20 and the inlet opening 14. The adsorbate comprising gas may in this case be the conventional gas stream coming from the air condition of a vehicle, for example. The gas stream enters the container 12 and thus interacts with the adsorbent agent 18, wherein the adsorbate is adsorbed by the adsorbent agent 18, thereby heating the gas being guided through the interior of the container 12 by adsorption energy. Consequently, a region 18a of the adsorbent agent 18 is loaded with adsorbate, whereas a further region 18b is still regenerated and has thus further heating capacity. The heated gas stream is then guided to a location to be heated via the outlet conduit or gas conduit 22 being connected to the outlet opening 16. The heating procedure may continue, until the entire adsorbent agent 18 is fully loaded with the adsorbate, e.g. with nitrogen, like it is shown in FIG. 1c. Subsequently, a regeneration step may follow.

Figure 2:
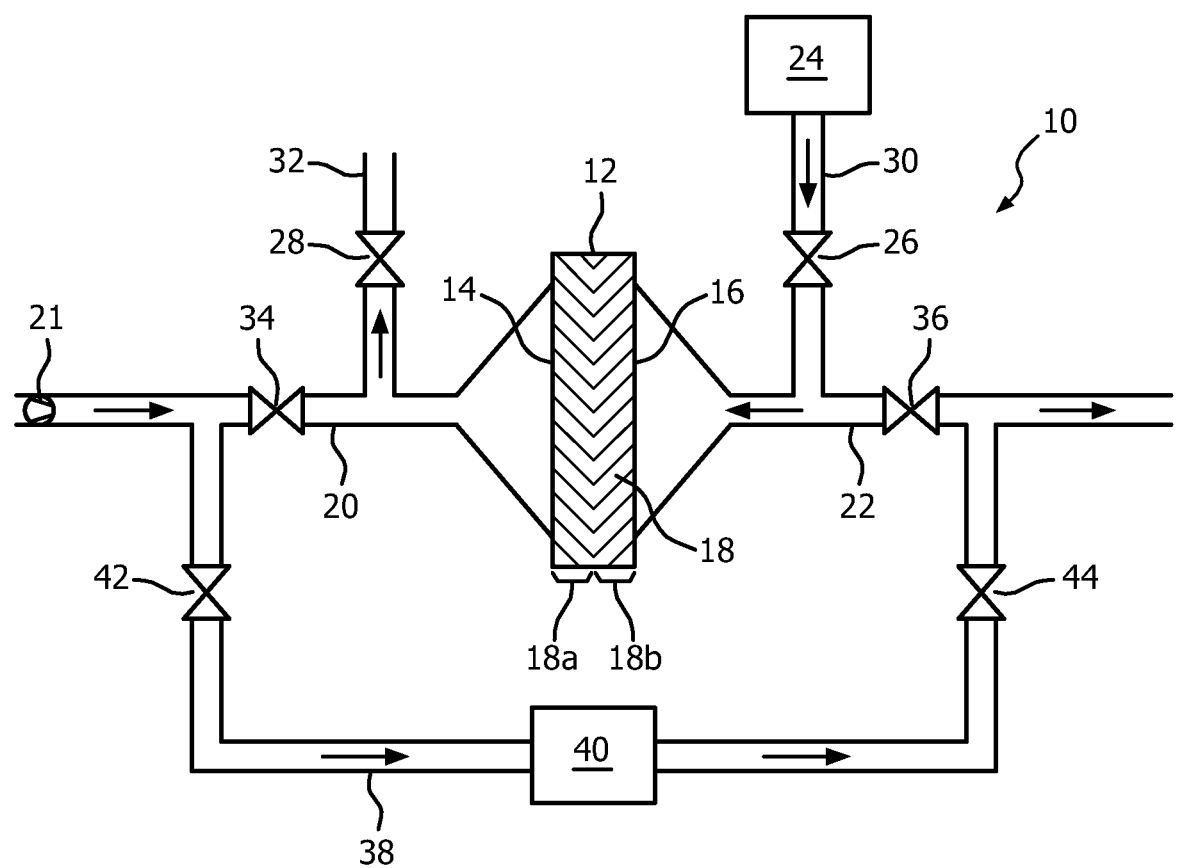
FIG. 2 shows an embodiment of a heating device according to the invention with a gas source for a regeneration step.

FIG. 2 shows an exemplary arrangement for re-loading, or regenerating, respectively, the adsorbent agent 18, such as the zeolite material, during a regeneration step. This may be realized after a warming-up phase of a vehicle, for example, when additional heating is no longer necessary. Regeneration may be performed, in an exemplary embodiment, by purging nitrogen out of the sieve with help of oxygen with sufficient purity. A regenerative manner is to use a gas source 24 for example to supply oxygen with sufficient purity. Preferably, an oxygen concentrator that concentrates oxygen from the surrounding air on demand, or an oxygen comprising gas cylinder as source for oxygen, or oxygen comprising gas, respectively may be provided. The oxygen comprising gas may be used for being adsorbed by the adsorbent agent 18, thereby desorbing the adsorbate used for generating heat, for example nitrogen. The gas source 24 may guide a gas allowed or not through a valve 26 being located in a conduit 30, through the outlet conduit 22, through the container 12 and through the inlet conduit 20 in case the container 12 is disconnected from the source of adsorbate comprising gas and being connected to the gas source 24. Branching of from the inlet conduit 20 with a valve 28 is an outlet conduit 32 for guiding the gas used for regenerating the adsorbent agent 18 out of the heating device 10. Due to the flow of oxygen comprising gas like stated above, the adsorbate, such as nitrogen, is desorbed from the nitrogen-loaded adsorbent agent 18a to form a regenerated adsorbent agent 18b. The regeneration may thereby be supported by means of heat, or vacuum, respectively by providing a heat source or a vacuum source acting on the interior of the container 12 or the adsorbent agent 18, respectively. Alternatively, the regeneration step may solely be based on heat and/or vacuum.

The flow of the adsorbate comprising gas used for regenerating the adsorbent agent 18, respectively, may be guided by the valves 26, 28 and furthermore by valves 34, 36 being arranged in the inlet conduit 20 upstream the outlet 32 and in the outlet conduit 22 downstream the conduit 30. Furthermore, a bridging conduit 38 may be provided. The bridging conduit 38 may be designed to bridge the container 12 by the adsorbate comprising gas. Consequently, the bridging conduit 38 may be connected to the inlet conduit upstream the valve 34 and with the outlet conduit downstream the valve 36. This allows guiding the adsorbate comprising gas via a heat exchanger 40 which may be used to heat the gas stream by waste heat of a motor, for example, in case sufficient waste heat is generated and a heating may be performed by said waste heat. In the bridging conduit 38, further valves 42, 44 may be provided to guide the respective gas streams.

Suitable regeneration times, or purging times, respectively, of the container 12 are dependent on amount of adsorbent agent 18 used, on the regeneration gas flow rate as well as of the degree of adsorbate loading of the adsorbent agent 18, for example. An exemplary indication of purging time and needed power is as follows: About half an hour may be needed to purge 1 kg of adsorbent agent 18 using an oxygen flow of about 5 l/min (needed power in case an oxygen concentrator is used may lie in the range of P~200 W/kg).

Additionally, in case the heating device 10 is in a regeneration mode, the interior of a vehicle, for example, may be heated by means of the adsorbate comprising gas, or by gas coming from a further gas source.

Off-times of the heating device 10, or for example of a motor vehicle being equipped with said heating device 10 do not influence the maintenance of the heating device 10 according to the invention as long as the adsorbent agent 18 containing cylinder 12 is sealed air tight after an operation phase. This may be realized, for example, by closing the valves 26, 28; 34, 36.

The above described method, or heating device 10, respectively, may come up with a significant increase of an adsorbent agent 18 temperature, for example, at a start of the heating device 10. This can be deduced from simple experiments performed on a specially designed sieve cylinder with adapted thermo-couples to measure the bead temperature in an exemplary and not limiting manner like can be seen in FIG. 3.

Figure 3:
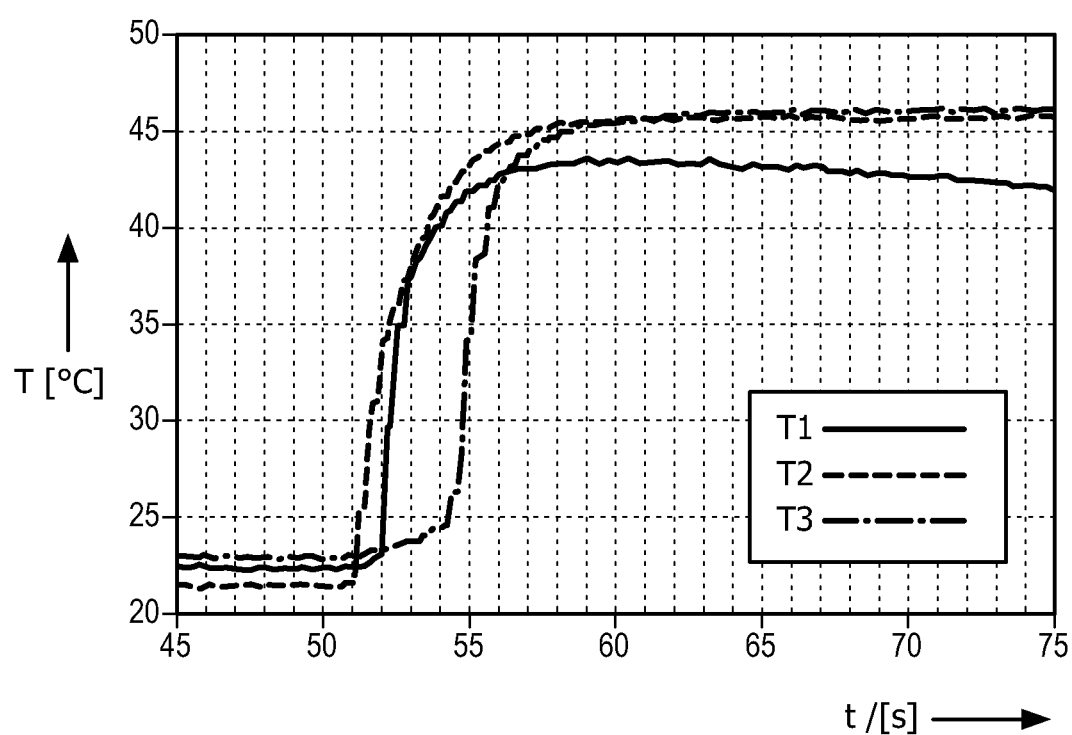
FIG. 3 shows a diagram showing exemplary results of a heating device which may be used in accordance with the present invention.

FIG. 3 shows the result of a typical experiment showing the working principle of the present invention. In order to perform this experiment, three thermocouples have been placed within a sieve material within a cylinder from the feed side. For the used Li-sieve material (SXSDM with total weight of 210 g) and the diameter of the cylinder of about 52 mm and a length of 155 mm, this temperature measurement characterizes the behavior of about 100 g of sieve material. The sieve material was purged with oxygen before the experiment (~100% replacement of nitrogen). The results obtained for using air as feed gas is displayed in FIG. 3, wherein T1 stands for a measurement at 1 cm in the sieve bed, T2 at 2.5 cm and T3 at 6 cm respectively with an air inflow of 0.5 l/min.

FIG. 3 shows that after starting the feed flow at about t=50 s, on the time scale of a few seconds the temperature increases significantly (>20° C. for T2 and T3). It is also visible from FIG. 3 that heat deposition takes place on a time scale of a few seconds. FIG. 3 also demonstrates that already small amounts of sieve material (1 cm of lengths) are sufficient for an efficient energy transfer from the sieve material to the air flow, wherein the temperature measured is the temperature of the air inside of the sieve cylinder. After the sudden increase at t ~50 s from about 23° C. to >45° C. air temperature slightly away from the feed side (T2 and T3) stays constant for long time (shown are only further 20 s) despite inflow is roughly hold constant. Only T1 shows some first cooling by the air feed at a temperature of 23° C. Therefore, in this example, out-flowing air at permeate side will hold high temperature for t>>1 min.

For the given example the temperature increase of the passing air is directly correlated to the difference of the adsorption energies of $N_2$ and $O_2$ at the zeolite. Using a Li exchanged zeolite material more than 20° C. air temperature increase is feasible. The amount of energy stored by a 100% replacement of oxygen by nitrogen may be in the range of ~30 kJ/kg.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A heating system of a motor vehicle, comprising:
an enclosed area of the motor vehicle; and
a heating device installed in the motor vehicle, the heating device comprising:
at least one container having an inlet opening and an outlet opening and comprising an adsorbent agent provided between said inlet opening and outlet opening and configured to adsorb an adsorbate thereby releasing adsorption energy;
a gas conveying device configured to convey a gas comprising the adsorbate through an interior of the container, where the adsorbate is nitrogen and the nitrogen comes in direct contact with and heats up the adsorbent agent instantaneously by released adsorption energy by bringing in contact the adsorbent agent with the gas comprising the adsorbate;
a gas conduit connected to the outlet opening of the container and configured to guide the gas heated by adsorption energy inside the container to the enclosed area outside of the gas conduit to be heated by the heated gas, wherein the enclosed area is heated independent from waste heat from a motor of the motor vehicle;

a flow path including the at least one container, where the flow path is configured to guide the heated gas from inside the at least one container to the enclosed area without provision of heat exchangers on the flow path; and a gas source for supplying a gas to regenerate the adsorbent agent, wherein the gas comprises oxygen with a purity of at least 85%.

2. The heating system according to claim 1, wherein the adsorbent agent comprises a zeolite.

3. The heating system according to claim 1, wherein the interior of the container is sealable in an airtight manner against the outer atmosphere.

4. The heating system according to claim 1, further comprising a heater and/or a vacuum pump for regenerating the adsorbent agent.

5. The heating system according to claim 1, wherein the heating device is a portable device.

6. The heating system according to claim 1, wherein the adsorbent agent comprises an at least partly unloaded adsorbent agent or a regenerating adsorbate.

7. A heating method, said method comprising the steps of:

installing a heating device in a motor vehicle;

providing at least one container having an inlet opening and an outlet opening and comprising an adsorbent agent provided between said inlet opening and outlet opening and configured to adsorb an adsorbate thereby releasing adsorption energy;

conveying a gas comprising the adsorbate through an interior of the at least one container wherein the adsorbate is adsorbed by the adsorbent agent, where the adsorbate is nitrogen and the nitrogen comes in direct contact with and heats up the adsorbent agent instantaneously by released adsorption energy by bringing in contact the adsorbent agent with the gas comprising the adsorbate, thereby heating the gas being guided through the interior of the container by adsorption energy;

guiding the heated gas via a gas conduit to an enclosed area of the motor vehicle outside of the gas conduit to be heated without provisions of heat exchangers on a flow path from the interior of the container to the enclosed area, wherein the enclosed area is heated independent from waste heat of a motor of the motor vehicle; and supplying, via a gas source, a gas to regenerate the adsorbent agent, wherein the gas comprises oxygen with a purity of at least 85%.

8. The method according to claim 7, wherein heat and/or vacuum is used for regenerating the adsorbent agent.

* * * * *